Dec. 5, 1961 R. CHAPMAN 3,011,938
PROCESS OF MAKING BOARD PRODUCTS
Filed Nov. 18, 1957 2 Sheets-Sheet 1
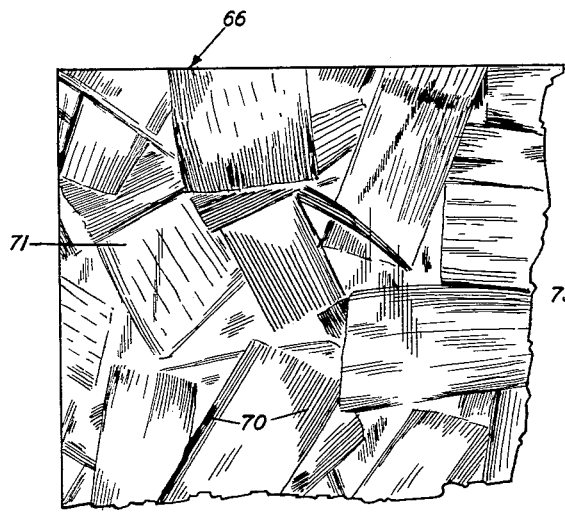
FIG. 1
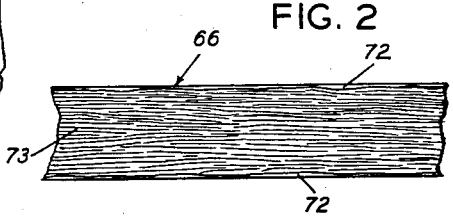
FIG. 2
FIG. 3
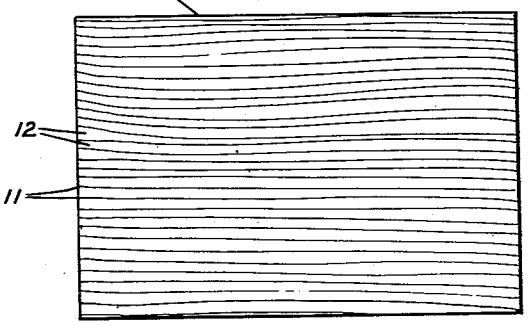
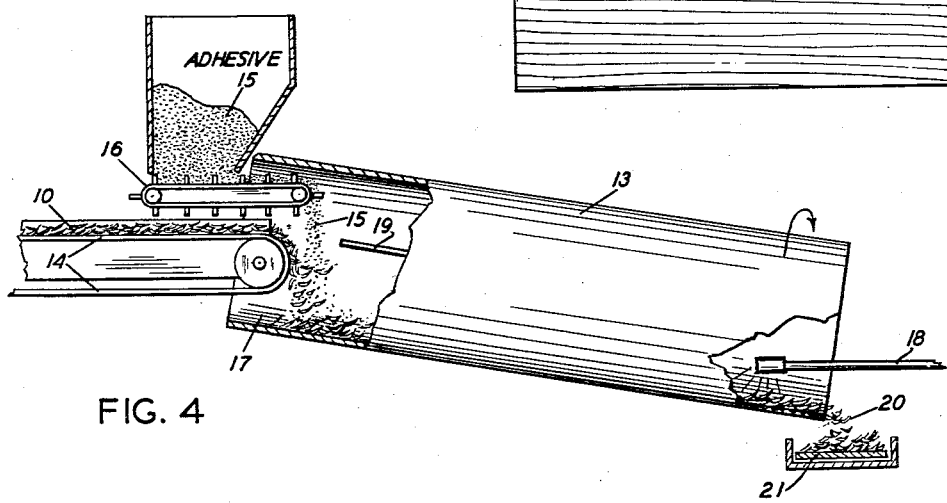
FIG. 4
INVENTOR.
RALPH CHAPMAN
BY
BUCKHORN, CHEATHAM & BLORE
ATTORNEYS Dec. 5, 1961   R. CHAPMAN   3,011,938
PROCESS OF MAKING BOARD PRODUCTS
Filed Nov. 18, 1957   2 Sheets-Sheet 2
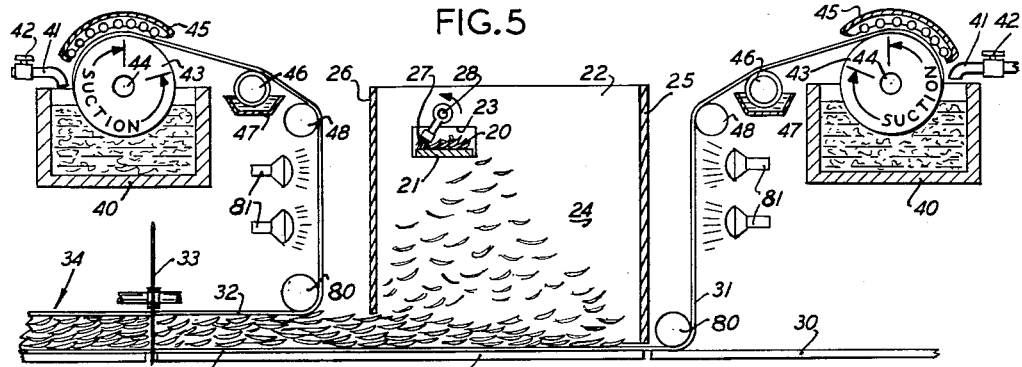
FIG. 5
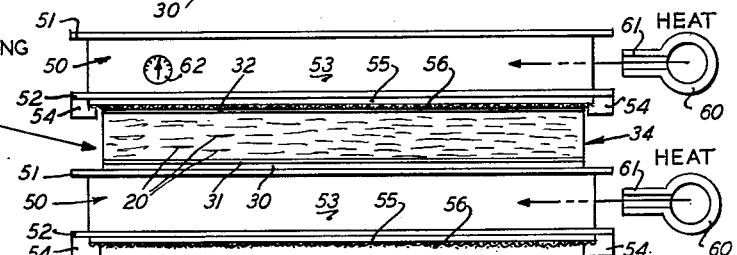
BEGINNING OF PRESSING OPERATION
FIG. 6
PRESSURE OF 30-50 LBS p.s.i.
FOR ½ TO 2 HOURS AT
275-325° F.
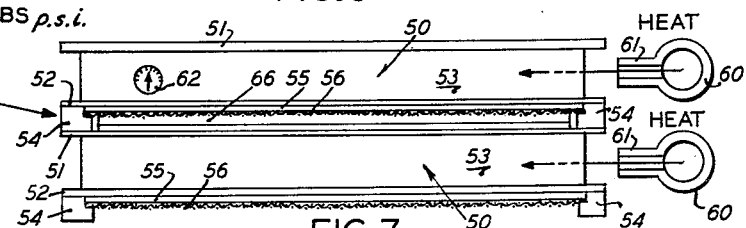
FIG. 7
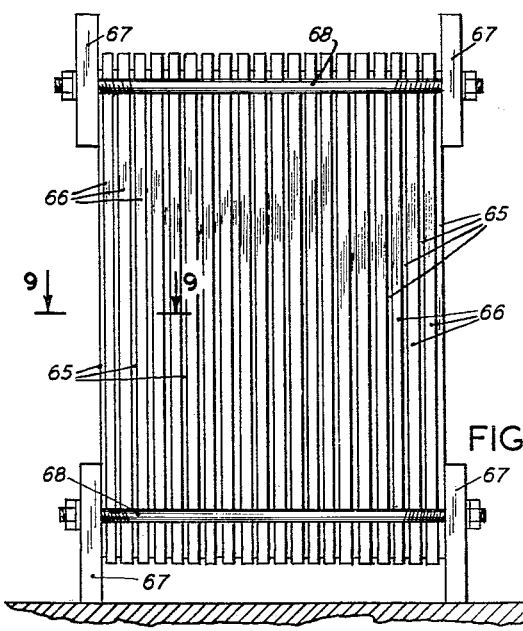
FIG. 8
FIG. 9
INVENTOR.
RALPH CHAPMAN
BY
BUCKHORN, CHEATHAM & BLORE
ATTORNEYS

3,011,938
PROCESS OF MAKING BOARD PRODUCTS
Ralph Chapman, Corvallis, Oreg., assignor to Wood Processes (Oregon) Ltd., Corvallis, Oreg., a limited partnership of Oregon
Filed Nov. 18, 1957, Ser. No. 697,030
11 Claims. (Cl. 162—124)

The present application relates to improvements in board products and the method of manufacturing the same.

In my prior applications, Serial No. 487,753, filed February 14, 1955, now abandoned; Serial No. 573,897, filed March 26, 1956, now Patent No. 2,947,654; and Serial No. 664,314, filed June 7, 1957, now abandoned, I disclose board products, the method of manufacturing the same, and equipment for accomplishing the manufacture thereof. Some of the products there disclosed comprise a consolidated core of wood particles and surface skins of consolidated interlaced ligno-cellulosic fibers. The present invention is a continuation-in-part of my parent application, Serial No. 487,753, and relates to improvements in such products and process, whereby board products having superior qualities are produced and manufacturing economies effected. Reference is also made to my Patent No. 2,992,152, issued July 11, 1961, on my application Serial No. 842,528, filed September 25, 1959, as a continuation of the aforementioned abandoned application Serial No. 487,753; my application Serial No. 850,577, filed November 3, 1959, a continuation-in-part of the aforementioned abandoned application Serial No. 487,753; my application Serial No. 850,580, filed November 3, 1959, a division of the aforementioned Patent No. 2,947,654; my application Serial No. 21,471, filed April 11, 1960, a division of this application; my application Serial No. 46,554, filed August 1, 1960, a continuation of the aforementioned abandoned application Serial No. 664,314; and my application Serial No. 129,601, filed August 7, 1961, entitled "Plywood Forming Machine and Method of Forming Plywood."

A board product may be manufactured in accordance with the present invention from almost any type of wood particle having at least one dimension lesser than the thickness of the resulting product. Sawdust, planer shavings, and hog fuel may be utilized, but the preferred form of wood particle, resulting in a board product having the greatest strength, comprises a wood veneer flake having a thickness in the order of about .010 inch to .030 inch, a breadth far greater, such as in the order of one-half to several inches, and a length of several inches. Such wood veneer flakes, as described in the foregoing applications, are preferably sliced parallel to the grain. Much thicker slices of wood could be utilized, but the resulting board would not be as homogeneous throughout for the reason that thin slices of wood, such as planer shavings or wood veneer flakes, are quickly softened throughout in the initial stages of heating and compression to consolidate the wood particles to the extent that the fibers of the wood particles slip with respect to each other and permit deformation of the particles into intimate contact with each other throughout. Thicker slices, while adjusting to some degree, would be proportionately less deformed into conformity with each other. Sawdust and hog fuel are usable, but the resulting boards have the least strength since the particles are not particularly elongated and the fibers thereof are somewhat crushed or cut into short lengths. Paner shavings are next to wood veneer flakes in desirability, being relatively thin and having width and thickness in far greater proportion than sawdust and hog fuel, such as the thickness being from several thousandths of an inch to one-eighth of an inch, the width being generally from one-eighth of an inch to three-quarters of an inch, and the length being generally from one-quarter of an inch to an inch and a half. Planer shavings are for the most part elongated, with the broad surfaces thereof extending parallel to the grain, but with one end curved across the grain due to the planer knives cutting downward at an arc while the board travels tangentially to the planer head. Planer shavings will soften and deform into intimate contact with each other throughout, but their strength is less than that of wood veneer flakes so that the resulting board does not have as great strength as a board made from wood veneer flakes. Boards made from wood veneer flakes formed in accordance with my invention may have five to six thousand p.s.i. modulus of rupture in bending in any direction; boards formed from planar shavings, from three thousand to four thousand p.s.i. modulus of rupture in bending; and sawdust and hog fuel boards, around two thousand p.s.i. modulus of rupture in bending, all when made with the same quantity and type of adhesive and produced in exactly the same manner.

Boards and panels made in accordance with my invention are becoming increasingly more important as available supplies of "peeler" logs suitable for the manufacture of plywood diminish. A medium density board product made in accordance with my invention can be manufactured from any suitable source of wood particles as defined above. An advantage of the present invention is that a relatively small plant may be located in proximity to a sawmill, furniture factory, or the like, in order to utilize the mill ends, waste lumber, sawdust and planer shavings produced thereby. A further advantage of the present invention is that a substitute for plywood may be produced in areas which do not have lumbering operations, since second grade trees, and trees which are ordinarily not used for lumber, may be utilized to produce large panels. Where there is a suitable source of planer shavings, for example, the planer shavings would be the logical source of material; but in other areas trees which are normally utilized only for pulp wood or cordwood may be sliced into wood veneer flakes to be utilized as set forth herein. Therefore, board products manufactured in accordance with the present invention may successfully compete with plywood not only because it is inherently less expensive to manufacture, while having comparable qualities, but also because it may have a large price advantage since it is manufactured locally rather than shipped long distances from the areas of presently available "peeler" logs.

Board products may be manufactured in accordance with my invention from almost any wood. Fir and spruce are most acceptable and hemlock is satisfactory. The various pines are satisfactory, particularly when dark colors due to the greater amounts of pitch are not objectionable. In sections of the country which do not have conifer forests, woods such as cottonwood, poplar, alder and other second growth woods normally used only for pulp wood or cordwood, are entirely satisfactory. Such second growth woods would normally be sliced into veneer flakes, but the cost of doing so increases the expense of production; and for this reason alone slicing may be less desirable if there is an available source of planer shavings or the like near at hand. The suitability of any wood for the present process depends primarily upon the amount of moisture within the wood which is driven out as steam when the wood is subjected to heating and pressing in the consolidating press, for which reason cedar is not desirable. Green wood is preferable to remoistened kiln-dried wood, and for this reason planer shavings from a sawmill producing lumber from green wood are highly desirable. Wood particles which contain between about twenty percent to about fifty percent by weight of the bone dry weight of fibers are satisfactory, with about thirty percent being ideal. The water is necessary to provide steam to soften the lignins and permit the fibers to bend and slip so that the particles may be deformed into intimate contact with each other, to cause powdered adhesives to adhere to the particles, and to gel the adhesive used to bind the particles together and cause the adhesive to flow into the spaces between the particles so as to form a uniform product. Wood having greater moisture content is acceptable but the time and amount of heat required to consolidate the board under heat and pressure is thereby increased, thus increasing the cost. Wood having less water is not acceptable, particularly if the amount is materially less than twenty percent, since there is not sufficient water available to produce the required amount of steam. Wood which has been dried to a bone dry state, or which has been allowed to rehumidify to the customarily normal six to seven percent by weight of water, may be used by moistening the particles so as to have available the desired amount of about thirty percent by weight of water. However, the resulting strength is less than the strength of a board produced with the same wood in the green state. Evidently, wood which has once been dried cannot recapture water in the same manner as the water is present naturally. Probably, there is some chemical or physical change in the cell structure of the wood which prevents the water from recombining in the same manner as it existed naturally before drying. Nevertheless, the resulting board is satisfactory since the decrease in strength is generally slight. At least, the use of green wood eliminates the expense of handling while remoistening the wood particles.

In accordance with my above mentioned applications, the wood particles are coated with a suitable adhesive, and deposited in a thick, loose layer between wet blankets of interlaced cellulosic fibers, produced preferably from reclaimed waste paper. A sandwich of wood particles is formed between two wet blankets of fibers each in the order of about one-eighth of an inch in thickness. This sandwich is heated and pressed in such manner as to create a board product, usually in the order of one-half to one inch in thickness, usually having a density in the order of 0.5 to 0.7, preferably 0.6, with dense, tough skins of compacted, cellulosic fibers interlocked with the irregular surfaces of the core formed by the particles. The resulting product is a smooth-surfaced board product displaying the surface pattern of the core to some extent due to high compression of the paper skins to a greater density above elevations in the core surface forming opaque areas in the skin, and low compression to a lesser density above the depressions in the surfaces of the core forming lighter areas in the skin. The dense areas have a density usually in the order of about 1.0 and the less dense areas have a density usually in the order of about 0.7, with gradations in between, above and below. If the reclaimed paper is de-inked the mottled effect is pronounced; but the effect is visible even though the ink remains in the paper, and even though a dye may be added to produce a more pleasant color than the color which the ink alone can produce. The resulting board product is sprayed, coated or otherwise treated on both surfaces with a siccative oil, such as linseed oil, tung oil, or polymerizable synthetic oils, so as to produce a board having oil-tempered surface skins. The oil increases the visibility of the mottled pattern, and renders the board more resistant to moisture absorption and swelling.

As set forth in my prior applications, the adhesive used to bind the core particles together may be any suitable adhesive, including protein adhesives such as casein, wheat flour and soybean flour, artificial resins such as phenol-formaldehyde resins, urea-formaldehyde resins, albumen, hide glue, or the like. All that was required, in my prior disclosures, was that the adhesive should be capable of adhering to the moist, wood particles and of being set or cured upon the application of heat and pressure. Also, sizing could be added, as well as insecticides, fireproofing agents, and the like.

I have now discovered that certain desirable properties and manufacturing economies result from limitations imposed on the adhesive selected, and from a different manner of oil-tempering the surface skins.

Accordingly, the present invention has for its primary object the production of a superior board product which is highly resistant to moisture absorption, swelling, checking, cracking or other weaknesses to which boards and board products are subject.

A further object of the present invention is to provide a process by means of which a board product having the greatest strength, homogeneity, and other desirable qualities is produced.

A further object of the present invention is to provide a method of manufacturing board products of the character described, whereby economies in the cost of production are achieved.

The present invention may be more readily understood by reference to the accompanying drawings wherein a preferred form of the product is illustrated, and the equipment for producing the product is schematically set forth, taken in connection with the following specification, wherein like numerals refer to like parts throughout.

In the drawings,

FIG. 1 is a plan view of a portion of one form of board product formed in accordance with the present invention, the board product comprising a core of wood veneer flakes;

FIG. 2 is an edge view of a board product such as illustrated in FIG. 1;

FIG. 3 is a view, on an enlarged scale, of a typical wood veneer flake utilized in making the board product of FIGS. 1 and 2;

FIG. 4 is a schematic representation of one form of equipment comprising a tumbler and material feeding means for applying adhesives and other materials to the wood particles;

FIG. 5 is a schematic representation of equipment including cylinder machines for forming a pair of endless, wet webs of interlaced cellulosic fibers, coating rollers for applying a siccative oil thereto, a former for interposing a layer of wood particles between the fiber webs, and a flying shear for cutting the ribbon thus formed into panel size sandwiches;

FIG. 6 is a schematic representation of a portion of a stack press in which heat and pressure are applied to the sandwiches, showing a sandwich at the commencement of the heating and pressing operation;

FIG. 7 is a similar view showing a sandwich at the completion of the heating and pressing operation in the stack press;

FIG. 8 is an end view of a stickered stack of finished panels in the process of being cooled and rehumidified; and FIG. 9 is a horizontal section through a portion of FIG. 8.

In accordance with my present invention any suitable wood particle appreciably larger than the individual fibers thereof, and appreciably larger than the small fiber bundles used in hardboard manufacture, such as sawdust, hog fuel, planer shavings, wood veneer flakes, or the like, may be utilized to form a core. It is to be understood that the present invention is not restricted to any particular type of a core material, and in the claims appended hereto I intend by the usage of the term "coarse components" to include all coarse, that is, relatively large size, rough components which have been proposed in any of the above applications, or utilized heretofore in the manufacture of cores for composite boards or boardlike products. In addition to the materials specifically mentioned above, this includes rough veneer sheets, unfinished plywood, hardboard and the like. FIG. 3 illustrates the most desirable form of wood particle comprising a wood veneer flake 10 which is in the order of .010 to .030 inch in thickness, from one-half to three inches in width, and from three to five inches in length. The veneer flakes are sliced parallel to the grain of the wood, as indicated in FIG. 3, wherein the hard growth rings 11 and intervening soft growth rings 12 are indicated. The wood particles contain from twenty to sixty percent, preferably about thirty percent, moisture based on the bone dry weight of the particles, preferably in the natural state such as by utilizing green wood. The particles are fed into a tumbling cylinder 13 as by means of an endless belt conveyor 14. A dry, powdered adhesive 15 is also introduced into the tumbling cylinder as by means of a metering chain 16. Any other additives in powdered form such as insecticides, fungicides, germicides, or the like, may be likewise introduced, such as by mixing the powders together before placing them in the bin of the metering device. Any liquid additive, such as a paraffin emulsion size, is sprayed into the tumbling cylinder as by means of a spray nozzle at the end of a pipe 18 leading from a source such as a pump (not shown). The spray nozzle is preferably located adjacent the outlet end of the cylinder so that the wood particles are coated with adhesive before contacting the paraffin size or the like. The tumbling cylinder is inclined downwardly and is provided with suitable means such as longitudinal ribs 19 within the cylinder whereby the wood particles are constantly picked up and dropped as they progress toward the lower end of the inclined cylinder. The dry, powdered adhesive adheres to the surfaces of the moist wood particles and is uniformly spread thereon by the rubbing of the particles against each other and against the wall of the cylinder. The particles fall out of the lower end of the tumbling cylinder as adhesive-coated particles indicated at 20, the particles preferably falling onto a conveyor belt 21 which conveys them to the forming equipment.

It has been determined since the above mentioned applications were filed, that not any adhesive is entirely satisfactory. The adhesive must be one which sets or cures after having been subjected to heat and pressure in the presence of steam, and must be one which will not be excessively absorbed into the wood particles. It must remain substantially on the surfaces of the wood particles, whether as a powder in the initial stage, as a gel upon being softened in the presence of steam, or as a cured adhesive when set. Numerous adhesives, including many phenol-formaldehyde, urea-formaldehyde, melamine, cresyl-aldehyde, and other synthetic resins have been tried and found more or less wanting. Certain adhesives which are satisfactory for binding individual cellulosic fibers together into a hardboard are not satisfactory. Many powdered adhesives, including all of the water-soluble adhesives, are largely absorbed by the moist wood particles as soon as applied thereto and absorb moisture from the wood, or as soon as they are liquified or gelled upon the application of heat and pressure, leaving only a slight or small percentage on the surfaces of the particles to bind them together. Casein, albumin, blood, hide glues, and many others, are subject to the same objections. Protein glues such as wheat flour and soybean flour are the most satisfactory natural adhesives.

Of all the adhesives which have been tried, two have been found particularly satisfactory. These two are soybean flour, a fine powder of about two hundred mesh resulting from grinding soybeans and from which almost all, if not all, of the soybean oil is extracted; and a phenolic resin sold as Resinox 673. This resin is a single stage resin, used as a fine, free flowing, yellow powder having the following properties:

| Property | Range |
| --- | --- |
| Dry rubber @ 150° C | 35–55 sec. |
| Softening Point | 78–90° C. |
| Moisture Content | 3% maximum. |
| Particle Size | 98% thru 200 mesh. |
| Flow | 35–50 mm. |
| Solubility | Soluble in alcohol or acetone, insoluble in water. |

The resin, being a single stage phenolic resin, will advance to a cured state quite quickly at elevated temperatures. In order to prevent a rapid increase in softening point and a marked reduction in dry rubber and fluidity of melt properties, it must be stored in a cool, dry place—preferably refrigerated.

Because of the relative cost, for example, five cents per pound for the soybean flour against thirty cents per pound for the resin, soybean flour is used to a major extent for most applications. The flour is applied in the range of about five percent to about ten percent by weight of the bone dry weight of the wood particles. Five percent is usual, since it gives good binding and the addition of more does not give increased strength in direct proportion. Up to five percent or about six percent, the strength of the product plotted against the percentage of adhesive is practically a straight line. At seven percent the curve has flattened out to a great extent, and at ten percent the curve is nearly flat, with negligible increases in strength for greater percentages.

In order to form a board which is highly resistant or proof to the attacks of fungi, insects, and rodents, various agents could be added. Any phenolic resin, or other materials such as pentachlorophenate, would be satisfactory for this purpose. However, since any such other phenolic resin or material will not remain on the surfaces of the particles to add binding strength, the Resinox 673 is preferred. About three-quarters of one percent to one percent by weight to the bone dry weight of the particles is added. Thus, the commercially produced board, for most applications, has six percent by weight of adhesive, consisting of five percent by weight soybean flour and one percent by weight of Resinox 673.

Where the board is to be exposed, such as when used for siding, roofing, or in contact with the ground, the amount of phenolic resin is preferably increased, and the amount of soybean flour proportionately decreased. Thus, the board may have adhesive ranging from nine percent by weight soybean flour and one percent by weight phenolic resin to ten percent by weight phenolic resin and no soybean flour. Soybean flour and Resinox 673 are compatible with each other, cure, set or solidify under the same treatment, and may be applied in the same manner with the same equipment.

Resinox 673 gives more of a straight line plot of strength against percentage. Sufficient adhesive of either type or their mixtures must be added to thoroughly coat the particles, and for this purpose a range of five percent to ten percent of resin, soybean or soybean-resin mixtures is necessary. When using phenolic resin alone about five percent will be sufficient for most purposes. Addition of greater percentages results in a more durable board, but any increase above ten percent renders the cost higher. The greater the amount of Resinox 673, the more indestructible the board becomes. A board having from five to ten percent by weight of Resinox 673 is practically untouchable by fungi, insects and rodents, is practically moistureproof, will not appreciably swell when immersed in water for a long time, will not separate when directly exposed to weather for long periods of time, is highly resistant to destruction by heat. A board formed with five percent soybean flour and one percent Resinox 673 is almost of the same caliber, being practically untouchable by fungi, insects and rodents, will swell somewhat but will not crumble or separate when immersed in water for a long time, is highly resistant to destruction by heat, and almost as resistant to crushing. Its bending strength is less but still highly satisfactory, being in the range of five to six thousand p.s.i. modulus of rupture in bending when using wood veneer flakes, three to four thousand p.s.i. modulus of rupture in bending when using planer shavings, and around two thousand p.s.i. modulus of rupture in bending when using sawdust or hog fuel.

A disadvantage of the use of a major proportion of soybean flour and only one percent of a phenolic resin is that such a board will swell at the edges as much as five percent while being transported in the open through a rain storm for several hours. This defect is successfully combatted by adding a suitable sizing, such as spraying the sizing onto the particles through the spray nozzle 18. A suitable sizing is paraffin emulsion, such as Paracol. From one-half to one percent is sprayed onto the particles to give a much higher resistance to moisture and to cause the board to shed water. If a greater percentage is used, the moisture resistance and water resistance will be increased, but the paraffin will interfere with the adhesive and the strength of the board will be reduced because of reduced inability of the adhesive to bind the particles together. The strength figures given above are for board having about three-quarters of one percent Paracol by weight of the bone dry wood particles incorporated in the core.

The coated particles 20 are conveyed by a belt conveyor 21 into a forming bin 22 through an opening 23 in a side thereof. The forming bin is rectangular, with side walls 24, a front wall 25, and a rear wall 26. A broom 27, extending from side wall to side wall, is mounted on a rotating shaft 28 which is so timed with respect to the speed of the conveyor 21 that the broom sweeps across the conveyor prior to the passage of the leading particles thereon through an exit opening (not shown) in the opposite wall of the forming bin. A conveyor at the bottom of the bin progresses a succession of caul plates 30 across the bottom of the bin. The caul plates support an endless web of loosely interlaced, moist, cellulosic fibers upon which the coated particles are deposited. The particles flutter through the air and are interleaved in random directions as a thick layer of closely massed particles on the web 31. The speed of the conveyor is such that the desired deposit of interleaved wood particles is formed on the web 31 by the time an increment thereof has progressed from wall 25 to wall 26. Planer shavings and wood veneer flakes are interleaved with their broad surfaces generally parallel to the web 31, and sawdust or hog fuel is deposited as a loosely compact mass. There is a space beneath wall 26 sufficient to permit passage of the desired depth of deposit. Suitable means (not shown) may be provided to level the deposit, and to alter the speed of conveyor 21 and broom 27 with respect to the speed of the web 31, whereby the thickness of the deposit may be controlled.

A deposit of closely adjacent planer shavings or wood veneer flakes approximately three inches in depth will give a medium-density board approximately five-eighths of an inch in thickness. Thicker or thinner boards within the range of one-quarter inch to one inch may be formed by controlling the rate of deposit of the particles with respect to the speed of the web. Or the same deposit which produces five-eighths inch board having a density of 0.6 may be utilized to create a thicker board having lesser density or a thinner board having greater density by controlling the press, as will later appear. However, the primary purpose of the present invention is to produce a medium density board having a density of about 0.6 as a substitute for plywood or natural wood boards.

When the web 31 with the deposit or coated particles thereon leaves the forming bin, a second and identical web 32 is placed thereon. The caul plates 30 are spaced slightly so that a flying saw 33 may separate the endless ribbon thus formed into sandwiches 34 of the desired size. Preferably the sandwich is slightly wider and longer than the finished product, for example, fifty inches by ninety-eight inches when producing a four foot by eight foot panel, thus providing about one inch at each edge for trimming purposes. This is desirable since the particles are not so firmly interleaved with each other at the edges, due to disruption in handling and due to the particles rebounding from the walls of the bin.

Any type of cellulosic fiber may be utilized to form the webs 31 and 32 which provide the blankets for the sandwiches 34; but it is preferred to use chemical pulp, due to the longer fibers and greater strength thereof, rather than ground wood pulp. Chemical pulp may be easily and economically obtained by reclaiming magazines, which are normally not used for any purpose due to the expense of reclaiming the pulp compared to the expense of reclaiming newsprint pulp. In fact, it is preferred to use magazines over other sources of chemical pulp papers because the clay or other filler in magazine paper is not harmful and in advantageous since it tends to close the pores of the resulting paper skins of the product. The magazines or other papers are agitated in water and run through attrition mills, consisting of two corrugated disks or a corrugated disk and a smooth surface, or the like, where they are reduced to a pulp. Staples used to bind the magazines together and other hard particles are immaterial and may be raked from the web-forming machine stock tank from time to time.

The ink may be left in the pulp, the resulting fiber skins of the board product being a slightly muddy color as a result. Or the pulp may be de-inked in accordance with the usual processes in order to give a clear, paper skin with increased visibility of the core pattern. Or a yellowish or reddish dye may be added in sufficient quantity to result in a light brown or tan skin or more pleasant appearance. For most purposes it is not necessary to de-ink or color the pulp in any fashion, since the greatest use, at the present time at least, for the resulting board is as wall sheathing, flooring or sub-flooring, furniture core stock, or other uses in which the surfaces of the board are covered or otherwise hidden from view.

Preferably a slight amount of alum, such as one-half to one percent by weight to the bone dry weight of fibers, is mixed into the pulp in order to cause flocking or clinging together of the fibers.

The fiber webs are formed on cylinder machines schematically indicated in FIG. 5, one adjacent each of the end walls of the forming bin. Each machine comprises a stock tank 40 into which slurry is pumped through an inlet pipe 41, the rate of admission of the slurry being controllable by a suitable valve 42. A large diameter suction cylinder 42 dips into the slurry and withdraws fibers onto the screen surface thereof, the white water being ejected through the hollow hub 44 of the cylinder in the usual manner. Since the speed of the cylinder is fixed with respect to the speed of the caul plates 30, the thickness of the deposit is regulated by regulating the consistency of the pulp slurry or the amount of suction applied. The usual valve means of cylinder machines (not shown) is utilized to cut off the suction at a certain point so that the web may be stripped from the cylinder and led into the forming equipment as illustrated. The web is partially dried by continuing the suction for a time after it emerges from the slurry, and also by subjecting it to heat supplied conveniently by a battery of incandescent heating elements 45, so that the web is heated and partially dried but still moist, as well as soft and pulpy. The moisture content of the web when it leaves the heating elements is at least twenty percent by total weight, preferably thirty percent.

The hot, partially dried web passes in contact with an oil applying roll 46 dipping into a supply trough 47 by means of which a quantity of a polymerizable oil is applied to the wire side of the web. The web then passes over an upper guide roll 48, then vertically downward and partially around a lower guide roll 80. The lower guide roll 80 at the inlet side of the bin 22 guides the web 31 onto the caul plates 30, and the other guide roll 80 presses the web 32 onto the core material, also pressing the core material into the lower web. Heating means such as a bank of infrared ray lamps 81 is positioned between the guide rolls to heat and partially dry the oiled web as the web passes between the guide rolls 48 and 80. The heat drives the oil into the web from the surface thereof in intimate contact with the fibers throughout and renders the oil-coated surface of the web almost dry to the touch.

Any drying oil such as linseed oil, tung oil, or other vegetable oils, or a synthetic substitute therefor could be used. A synthetic oil sold as CTLA Polymer is very satisfactory and it is superior to most oils. CTLA Polymer is a petroleum by-product which is inexpensive and available in large quantities. It is applied as a solution in a vaporizable mineral oil base solvent, about twenty to forty percent solvent to oil being permissible. The solvent is vaporized in the press and escapes with the steam. About fifteen percent to thirty percent by weight of cured solids of polymerized and oxidized oil to the bone dry weight of the fibers is applied. The web, being partially dried and heated by the heating units, soaks up the oil, and that which remains on the surface is immediately driven into the web or partially polymerized on its surface by the infrared lamps 81. The ability of the web to absorb the amount of oil indicated above is due to the application of the oil in heated state to the web while it is a loosely interlaced fiber web, without any mechanical compression having occurred beyond that which is effected by the suction of the fibers onto the cylinder of the forming machine. For some purposes, it would be desired to double the amount of oil being utilized, but such a large amount of oil should not be applied at this point because it would be expressed from the webs in the press, interfering with the adhesive, discoloring portions of the product surfaces, forming deposits on the platens of the press, and creating a fire hazard.

The oil could be applied by heating the oil rather than heating the web, since heated oil will flow into the web regardless of the presence of the moisture. However, the fibers might not be as thoroughly coated with oil, and the greater amount of moisture remaining in the web would require longer heating in the forming press.

CTLA Polymer is described by the manufacturer as follows:

Description

CTLA Polymer is a heat-reactive, aromatic-type olefinic liquid hydrocarbon polymer that is obtained from petroleum. It is highly unsaturated and dries by both oxidation and polymerization.

Physical properties

| | |
|---|---|
| Specific gravity, 60/60° F | 1.00–1.02 |
| Viscosity, SSU, @ 210° F | 100–300 |
| Flash, Cleveland open cup, min., F | 210 |
| Iodine No. (Wijs), min | 190 |
| Water, ASTM D–95, Mas, percent | 0.8 |
| Nonvolatile, ASTM D–154 min., percent | 80 |

(The "volatile" portion consists of low molecular weight polymer and as such has about the same reactivity and drying properties as the non-volatile portion.)

The web which is formed is preferably about one-eighth of an inch thick on the cylinder machine, or sufficient to give a surface skin of about 115 pounds of bone-dry paper per 1000 square feet of product surface, there being a total of about 230 per 1000 square feet of double-surfaced board.

The sandwiches 34 are fed into any suitable hot press where the material is consolidated into the final product. The press is preferably a stack press as disclosed in the above-mentioned applications since there is no necessity for accumulating a bank of sandwiches as is the case with a multiple opening press. Also, since the output is continuous, the boards may be individually handled rather than handled in stacks. Also, the temperature, pressure, and time of heating and pressing may be accurately and easily controlled. The press comprises a plurality of separate platens 50, each of which comprises an upper plate 51 and a lower plate 52 welded to a plurality of spaced upright ribs 53, the ribs and plates forming passages from side to side of the platen. A plurality of such platens are successively shuffled from top to bottom of a stack of platens in the hot press as explained in the above-mentioned application Serial No. 664,314. The lower plate 52 of each platen is provided with a pair of undercut jibs 54 along its opposed side edges. The undercut jibs retain an aluminum caul plate 55 against the lower plate 52, and for most purposes also retain a screen 56 against the lower surface of the caul plate 55. The width of the platens is such that the sandwich 34 may be interposed between the jibs 54 which project downwardly in position to engage the outer edges of the next lower upper platen when the material is compressed so as to limit the thickness, and hence the density, of the resulting product. The jibs are removable and may be replaced with other jibs of varying thicknesses to vary the thickness or density of the product as desired.

As the platens progress upwardly in the stack press, they pass a plurality of heat sources represented herein by horizontal hot air supplying pipes 60 having nozzles 61 directed toward the open sides of the platen. The number of such supply pipes and the temperature of the hot air supplied therethrough may be controlled to control the temperature of the stack and the duration of application of hot air to the stack. The hot air sources may be staggered from side to side of the press to even the heating effect thereof. Other sources of hot air or hot gas may be utilized such as by directing burning gas jets through burner nozzles replacing the air outlet nozzles 61. When a platen carrying a finished board reaches the top of the stack, it is lowered alongside the stack to the level of its bottom, the board is removed, a new sandwich placed thereon, and the platen carrying the sandwich is reintroduced to the bottom of the stack, thereby conserving heat and causing the sandwich to be rapidly heated inwardly from both surfaces through the wet blankets.

Each, or at least every third platen, is provided with a thermometer 62 in such a location as to be visible to the operator as the platen traverses the stack. Preferably the platen, at the moment when the caul plate and sandwich are placed upon it, is at a temperature of approximately 275° F., but this temperature is not critical. The platen could be absolutely cold, but having it rapidly replaced in the stack conserves heat and thus reduces cost. The stack is preferably so controlled that by the time the platen has progressed approximately one-third of the way up the stack, the temperature thereof is approximately 350° F. At this point it passes beyond the heating zone and cools to about 290° F. by the time it reaches the top of the stack. The temperature of the sandwich is progressively less from its surfaces toward the center at the beginning, and as the material is compacted the temperature probably equalizes throughout and approaches the temperature of the platens. It is merely necessary to heat the particles throughout to a temperature higher than the boiling point of water so that the steam will form, then to maintain the atmosphere of steam for sufficient time to allow the fibers to slip and the material to settle into intimate contact with each other, and then to drive off the steam while the fibers reset in an annealed condition without internal stresses.

The reason for shutting off the heat in about one-third of the pressing time is in order not to overheat and burn the board surfaces. The allowable limits of temperature of the particles themselves and of the surface fibers cover a wide range, it merely being necessary that the temperature be above 212° F. and below the charring point of the fibers in the surface mats, as well as below the charring point of the adhesive. Soybean flour will brown if it is held at a temperature of 350° F. or higher for too long a period of time, the browning resulting in reduced strength. Holding to a minimum temperature of about 275° F. is economical. The temperature of the platen could be held at 275° F. all the time that it is within the stack, but the time of formation would be increased thereby. If the wood particles are too dry initially, or if they are dried too fast, it would be necessary to use pressures much greater than required by maintaining the temperature within the material at around 275° F. to 325° F. at any time that it is within the press after the first few minutes. Steam formed from the moisture in the particles softens the fibers and the lignins binding them together so that a stack pressure of about 30 to 50 p.s.i. is satisfactory for forming a ¾ inch board having a density of about 0.6, for example. Increased pressures may be necessary, even up to several hundred p.s.i., to compact the same amount of material into a thin board, for example, ⅜ of an inch thick and having a density of about 1.0 or higher.

If the screens 56 were eliminated, as in accordance with the disclosures of the above-identified applications, a satisfactory board results, both surfaces being smooth. However, for most purposes, it does not matter whether the surface is wire-marked or not, and screens could be applied to both the upper and lower platens, or one side may be wire-marked and the other side smooth as would be the result from a press as illustrated in FIGS. 6 and 7. It has been determined that most of the actions involved in softening the particles, adjustment of the particles into close conformity with each other, relieving stresses in the core, curing most of the adhesive, and polymerizing most of the oil in the surface skins, is accomplished in about twenty to thirty minutes, or less than half of the pressing time. The remaining time that the board remains in the press is desirable to drive out almost all the moisture and reduce the board to substantially bone-dry state, say, for example, two to three percent moisture content, to completely cure all of the adhesive throughout the board, to polymerize as much of the oil as possible and, most important, to drive out all of the steam so that when the pressure is released the surfaces of the board will not blow apart.

When manufacturing a board in the range of ⅝ to one inch in thickness, these results are achieved in a stack press wherein the board remains for a period of from one hour to one and one-half hours, depending upon the moisture content of the particles, and the presence or absence of a screen or screens 56. The maximum time of about two hours is required for a very thick board when no screens are utilized since all the steam must escape through the interstices of the material. A very thin board may require only one-half hour. Utilizing one screen cuts the time as much as one-third for a thick board, and utilizing two screens reduces the time required even further.

Applying the oil to the paper webs before consolidating the material serves three purposes, as follows:

First, the oil penetrates the entire surface of the fiber web to prevent jelled adhesive, and sugars and other materials expressed from the wood, from passing through the webs to stain the surfaces thereof or to char on the caul plates and form deposits which have to be scraped off. If it were not for the oil being applied prior to pressing, the resulting paper skins would, in many instances, be spotted or blotched with discoloring materials.

Secondly, the oil prevents sticking of the material to the caul plates or to the wire screens and eliminates the expense and labor of applying a parting compound thereto.

Thirdly, the oil penetrates the entire web so that the entire paper skin is oil tempered, much more so than when oil is applied after the board is formed. Boards formed in accordance with the present disclosure have tougher skins which are harder to separate from the core material than when the oil is applied later in accordance with my prior practice. The skins are more uniformly resistant to moisture absorption, shed water, are more resistant to flaking or peeling off with a sharp instrument, are more uniformly colored, and display the mottled appearance reflecting the core to much greater advantage.

It is to be noted that the wire surfaces of the webs become the outer surfaces of the sandwiches 34. The wire marks from the cylinders 43 are rapidly ironed out in the initial application of heat and pressure so that one or both surfaces of the resulting board are smooth. The wrinkled or "prune skin" surface of the web is next to the core where large wrinkles and folds are immaterial, perhaps enhancing the interlocking of the fibers of the webs with the outer particles of the core. Since the web is in a loosely felted, soft and pulpy condition and is deposited in contact with a loosely interleaved or massed layer of particles prior to the application of any pressure to the core material, to the webs, or to the combined sandwich thereof, the inner fibers of the webs are interlocked with the irregularities of the surface core particles and pressed or extruded into the interstices between them. Not only is there a mechanical bonding thus effected, but the setting or curing of the adhesive occurs after there is a mechanical interlocking of the fibers with the core particles so that positive bonding of the web to the core is possible.

As noted above, a higher percentage of oil would be desirable for some purposes, but the application of about 15% to 30% polymerizable solids of oil to the bone-dry weight of the fibers is all that is desirable prior to heating and pressing. The resulting board is absolutely satisfactory for inner sheathing, sub-flooring, core stock, or other applications in which the boards are not subjected to moisture to any great extent or for any duration of time. However, if the board is to be utilized for counter top drainboards, flooring upon which a wet adhesive is spread to retain a floor covering, or exterior surfaces such as exposed siding or roofing, a higher percentage of oil is desirable. As much as 15% to 30% more oil can be applied by spraying, roller coating, or any other convenient method. Preferably the additional oil is applied immediately after removing the board from the press since more oil penetrates further when the board is hot.

Not all of the oil applied previous to the pressing is cured in the hot press, particularly since air is excluded from the materials by the escaping steam, and by the imperforate caul plates, particularly when no screen is utilized. This is not to say that air is necessary to polymerize a polymerizable oil, but a certain degree of oxidation of almost any oil is required for complete curing thereof, so much so that if the hot boards are piled face to face immediately upon leaving the press there is danger of internal combustion charring the boards in spots, if not resulting in actual fires. For this reason the boards, whether additional oil is applied or not, are cooled in the presence of freely circulating air. A convenient method of accomplishing this result is to place ¼ inch sticker laths 65 at intervals between a plurality of the finished boards 66, grip the stack between pairs of beams 67 retained by tie rods 68, and stand the stack on edge in such manner that air may freely circulate therethrough. Any other method may be employed such as by conveying the boards singly through a forced draft tunnel. The board cools to room temperature when stacked as described above in a period of one-half to two hours depending upon the velocity and temperature of the air. After the boards have stood on edge for twelve to forty-eight hours they are piled face to face.

A further advantage which accrues from thus curing the boards in the open is that they are rehumidified from the bone-dry or practically bone-dry condition that exists when they leave the press to the normal 6% or 7% humidity. The boards, therefore, are not in danger of warping when put to use. Of course, it is to be appreciated that the warping danger exists primarily with boards having a higher percentage of soybean flour, but some tendency to warp exists regardless of the adhesive used.

A typical board 66 is illustrated in FIGS. 1 and 2, this board being made from wood veneer flakes as illustrated in FIG. 3. The pattern of the outer wood veneer flakes is displayed by the paper skins as opaque areas 70 separated by lighter areas 71. The opaque areas are areas of densely consolidated fibers, having a density of about 1.0, and the lighter areas are areas of less consolidated fibers, having a density of about 0.7, with variations in both densities. The dense areas occur above plateaus or elevations formed by the outer wood particles and the lighter areas exist above the depressions or interstices between the outer wood particles. It is to be understood, however, that such depressions or interstices are substantially filled by the fibers from the webs. When a clear pulp slurry is utilized, the grain of the wood particles is discernible in places, and to a certain extent the same effect is visible when using ink and dye impregnated slurries.

The paper skins 72 of irregular thickness, and the core 73 flat wood veneer particles lying generally parallel to the surfaces of the board and bent into conformity with each other, are illustrated in FIG. 2. A board having a core of planer shavings is very similar except that the mottled effect reflects the smaller particles, and the particles themselves do not lie as predominately parallel to the surfaces of the board. Board utilizing sawdust or hog fuel reflects the smaller particles of the core, and the particles extend in all directions to a greater extent than with the wood veneer flakes and planer shavings.

The term "drying oil" as utilized in the claims is not to be limited to any particular oil, but includes linseed oil, tung oil, other vegetable oils, and any synthetic substitute for a drying oil such as CTLA Polymer, any and all of which penetrate the fiber webs to bar the passage of discoloring materials from the core to the outer surfaces of the webs, prevent sticking of the webs to the caul plates, and temper the skins so as to increase resistance to moisture absorption and improve the appearance and other qualities of the product.

Having illustrated and described preferred embodiments of the present invention, it should be realized that the invention permits of modification in detail. I claim as my invention all such modifications as come within the true spirit and scope of the following claims.

I claim:

1. The process of forming board products comprising vacuum forming a pair of loosely felted webs from a thin slurry of cellulosic fibers in water, reducing the free water content thereof to an amount not less than twenty percent of the weight of the webs without appreciable compression whereby the webs are still wet and pulpy, coating the outer surface of said webs with a drying oil, interposing between said webs while still in said wet, pulpy condition a core of coarse wooden components, said core components having a moisture content of about twenty to sixty percent by weight of the dry weight of the wooden material defining said core, and being coated with from about five to ten percent by weight of an adhesive powder capable of remaining on the surfaces of said components when heated in the presence of steam without being absorbed appreciably by the wood core components, and capable of being set under heat and pressure, then consolidating the whole under heat and pressure, the heat being in the range of 275° F. to 325° F., the pressure being in the range of 30 p.s.i. to several hundred p.s.i. depending upon the desired density of the resulting product, with the heat and pressure being maintained for a sufficient time, in the range of one-half to two hours, to render the product almost bone-dry, then cooling the product while exposed to freely circulating air until rehumidified back to the normal six or seven percent, to form a board product having thin, dense skins of oil-tempered, consolidated fibers bonded to the broad surfaces of the core with the fibers on the inner surfaces of the webs interlocked with the surface fibers of the adjacent core and bonded thereto by adhesive.

2. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a core of coarse wooden components between said webs, said components being coated with an adhesive powder, said components being moist to the extent of about twenty to sixty percent by weight of the dry weight of the components, then consolidating the whole under heat and pressure, the heat being in the range of 275° to 325° F., the pressure being in the range of 30 p.s.i. to several hundred p.s.i. depending upon the desired density of the resulting product, with the heat and pressure being maintained for sufficient time, in the range of one-half to two hours, to render the product substantially bone-dry, then cooling the product while exposed to freely circulating air until rehumidified back to the normal six or seven percent, to form a board product having thin, dense skins of oil-tempered, consolidated fibers bonded to the broad surfaces thereof with the fibers on the inner surfaces of the webs interlocked with the adjacent surface fibers of said core and bonded thereto by the adhesive.

3. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a thick layer of closely massed wood particles of large size compared to the individual fibers thereof between said webs, said wood particles being coated with a single stage, powdered phenolic resin which is soluble in alcohol or acetone and insoluble in water, in the amount of about five to ten percent by weight to the dry weight of the wood particles, said wood particles being moist to the extent of about twenty to sixty percent by weight of the dry weight of the wood particles, then consolidating the whole under heat and pressure, the heat being in the range of 275° F. to 325° F., the pressure being in the range of 30 p.s.i. to several hundred p.s.i. depending upon the desired density of the resulting product, with the heat and pressure being maintained for sufficient time, in the range of one-half to two hours, to render the product substantially bone-dry, then cooling the product while exposed to freely circulating air until rehumidified back to the normal six or seven percent, to form a board product of consolidated wood particles having thin, dense skins of oil-tempered, consolidated fibers bonded to the broad surfaces thereof with the fibers on the inner surfaces of the webs interlocked with the adjacent wood particles and bonded thereto by adhesive.

4. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a layer of closely massed wood particles of large size compared to the individual fibers thereof between said webs, said wood particles being coated with a mixture of soybean flour and a single stage, powdered phenolic resin which is soluble in alcohol or acetone and insoluble in water, in the amount of five to ten percent of the mixture by weight to the dry weight of the wood particles, with no less than one-half of one percent by weight of the phenolic resin and proportionately decreasing percentages of soybean flour as the amount of phenolic resin is increased, said wood particles being moist to the extent of about twenty to sixty percent by weight of the dry weight of the wood particles, then consolidating the whole under heat and pressure, the heat being in the range of 275° F. to 325° F., the pressure being in the range of 30 p.s.i. to several hundred p.s.i. depending upon the desired density of the resulting product, with the heat and pressure being maintained for sufficient time, in the range of one-half to two hours, to render the product substantially bone-dry, then cooling the product while exposed to freely circulating air until rehumidified back to the normal six or seven percent, to form a board product of consolidated wood particles having thin, dense skins of oil-tempered, consolidated fibers bonded to the broad surfaces thereof with the fibers on the inner surfaces of the skins interlocked with the adjacent wood particles and bonded thereto by the adhesive.

5. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a layer of closely massed wood particles of large size compared to the individual fibers thereof between said webs, said wood particles being coated with an adhesive mixture of about five percent by weight of soybean flour and about one percent by weight of a single stage, powdered phenolic resin which is soluble in alcohol or acetone and insoluble in water, and also coated with about one-half to one percent by weight of a paraffin sizing applied after applying the adhesive mixture, said wood particles being moist to the extent of about twenty to sixty percent by weight of the dry weight of the wood particles, then consolidating the whole under heat and pressure, the heat being in the range of 275° F. to 325° F., the pressure being about 50 p.s.i., with the heat and pressure being maintained for sufficient time, in the range of one-half to two hours, to render the product substantially bone-dry and limiting the extent of compression, then cooling the product while exposed to freely circulating air until rehumidified back to the normal six or seven percent, to form a board product of consolidated wood particles having a density of about 0.6 and having thin, dense skins of oil-tempered consolidated fibers bonded to the broad surfaces thereof with the fibers on the inner surfaces of the skins interlocked with the adjacent wood particles and bonded thereto by the adhesive, the pattern of the outer wood particles being discernible as mottled areas within the skins with darker areas above the higher portions of the outer wood particles and lighter areas above the spaces between the outer wood particles.

6. The process set forth in claim 5 wherein said webs provide paper skins each having a weight of about 115 pounds of consolidated fibers per one thousand square feet of surface of the product.

7. The method of forming a board product comprising preparing a first aqueous slurry formed loosely felted web unit of interlaced cellulosic fibers, said unit having a moisture content not less than twenty percent by weight, and being impregnated from one surface thereof with a drying oil whereby the resultant web unit is soft and pulpy, assembling upon said first web unit while still in said wet and pulpy condition, and upon the surface thereof opposite said oil impregnated surface, a core layer of relatively coarse wooden components coated with an adhesive, placing a second web unit prepared similar to said first web unit over the upper surface of said core layer and with the oil impregnated surface thereof facing outwardly, the opposite surfaces of said core layer being rough, uneven and having depressions therein, compressing the assembled web units and core between platens whereby the fibers are extruded from the pulpy web units into the depressions in the adjacent core surface substantially filling the same, maintaining the assembled web units and core layer under pressure between said platens at an elevated temperature for a sufficient length of time to set the adhesive and to dry the assembly, whereby said web units are transformed into dense, hard and tough surface skins firmly bonded to said core layer.

8. The method of forming a board product comprising vacuum-forming a first loosely felted mat from a thin slurry of cellulosic fibers in water, reducing the free water content of the mat without appreciable compression of the mat whereby the mat is still wet and pulpy, coating the outer surface of said mat with a drying oil, assembling upon the inner surface of said first mat while in said wet, pulpy condition, a core layer of relatively coarse wooden components coated with adhesive, placing a second mat prepared similar to said first mat over the upper surface of said core layer and with the oil coated surface facing outwardly, compressing the assembled mats and core between platens, maintaining the assembled mats and core layer under pressure between said platens at an elevated temperature for a sufficient length of time to set the adhesive and to dry the assembly and to transform said mats into dense, hard and tough skins firmly bonded to said core layer, the outer surfaces of the resultant board product being substantially free from any discoloration due to passage of adhesive, sugars and like substances from the core components through said webs during compression of said assembly.

9. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a core of coarse woody components between said webs, said components being coated with a single stage, powdered phenolic resin which is soluble in alcohol or acetone and insoluble in water, in the amount of about five to ten percent by weight to the dry weight of the wood components, said wood components being moist to the extent of about twenty to sixty percent by weight of the dry weight of the components, then consolidating the whole under heat and pressure, the heat being in the range of 275° F. to 325° F., the pressure being in the range of 30 p.s.i. to several hundred p.s.i. depending upon the desired density of the resulting product, with the heat and pressure being maintained for sufficient time, in the range of one-half to two hours, to render the product substantially bone dry, then cooling the product while exposing to freely circulating air until rehumidified back to the normal six or seven percent, to form a board product of consolidated wood components having thin, dense skins of oil-tempered, consolidated fibers bonded to the broad surfaces thereof with the fibers on the inner surfaces of the webs interlocked with the adjacent surface fibers of the core components and bonded thereto by adhesive.

10. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a core of coarse wooden components between said webs, said components being coated with a mixture of soybean flour and a single stage, powdered phenolic resin which is soluble in alcohol or acetone and insoluble in water, in the amount of five to ten percent of the mixture by weight to the dry weight of the wood components, with no less than one-half of one percent by weight of the phenolic resin and proportionately decreasing percentages of soybean flour as the amount of phenolic resin is increased, said wood components being moist to the extent of about twenty to sixty percent by weight of the dry weight of the wood components, then consolidating the whole under heat and pressure, the heat being in the range of 275° F. to 325° F., the pressure being in the range of 30 p.s.i. to several hundred p.s.i. depending upon the desired density of the resulting product, with the heat and pressure being maintained for sufficient time, in the range of one-half to two hours, to render the product substantially bone dry, then cooling the product while exposed to freely circulating air until rehumidified back to the normal six or seven percent, to form a board product of consolidated wood components having thin, dense skins of oil-tempered, consolidated fibers bonded to the broad surfaces thereof with the fibers on the inner surfaces of the skins interlocked with the adjacent surface fibers of the core components and bonded thereto by the adhesive.

11. The process of forming board products comprising forming a pair of loosely felted webs from a thin slurry of cellulosic fibers in water, heating the webs to reduce the free water content thereof to an amount not less than twenty percent of the weight of the webs without appreciable compression thereof, immediately thereafter coating the outer surfaces of the heated webs with a drying oil, interposing a layer of coarse wooden components between said webs, said wood components being coated with an adhesive mixture of about five percent by weight of soybean flour and about one percent by weight of a single stage, powdered phenolic resin which is soluble in alcohol or acetone and insoluble in water, and also coated with about one-half to one percent by weight of a paraffin sizing applied after applying the adhesive mixture, said wood components being moist to the extent of about twenty to sixty percent by weight of the dry weight of the wood components, then consolidating the whole under heat and pressure, the heat being in the range of 275° F. to 325° F., the pressure being about 50 p.s.i., with the heat and pressure being maintained for sufficient time, in the range of one-half to two hours, to render the product substantially bone dry and limiting the extent of compression, then cooling the product while exposed to freely circulating air until rehumidified back to the normal six or seven percent, to form a board product of consolidated wood components having a density of about 0.6 and having thin, dense skins of oil-tempered consolidated fibers bonded to the broad surfaces thereof with the fibers on the inner surfaces of the skins interlocked with the adjacent surface fibers of the core components and bonded thereto by the adhesive.

References Cited in the file of this patent

UNITED STATES PATENTS

| | | |
|---|---|---|
| 1,844,861 | Mason | Feb. 9, 1932 |
| 1,955,411 | Darrah | Apr. 17, 1934 |
| 1,995,145 | Frost | Mar. 19, 1935 |
| 2,067,012 | Loetscher | Jan. 5, 1937 |
| 2,398,632 | Frost et al. | Apr. 16, 1946 |
| 2,642,371 | Fahrni | June 16, 1953 |
| 2,680,995 | Frost et al. | June 15, 1954 |
| 2,693,619 | Goss | Nov. 9, 1954 |
| 2,761,487 | Ware | Sept. 4, 1956 |
| 2,817,617 | Rogers | Dec. 24, 1957 |
| 2,853,413 | Christian | Sept. 23, 1958 |

FOREIGN PATENTS

| | | |
|---|---|---|
| 452,207 | Great Britain | Aug. 17, 1936 |
| 680,367 | Great Britain | Oct. 1, 1952 |